United States Patent
Mani

(10) Patent No.: US 12,333,594 B1
(45) Date of Patent: Jun. 17, 2025

(54) SYSTEM AND METHOD FOR PROVIDING PERSONALIZED AND IMMERSIVE SHOPPING EXPERIENCE

(71) Applicant: UNTHINK INC., Dallas, TX (US)

(72) Inventor: Mary Mani, Dallas, TX (US)

(73) Assignee: UNTHINK, INC., Dallas, TX (US)

( * ) Notice: Subject to any disclaimer, the term of this patent is extended or adjusted under 35 U.S.C. 154(b) by 496 days.

(21) Appl. No.: 17/827,985

(22) Filed: May 30, 2022

Related U.S. Application Data

(60) Provisional application No. 63/194,872, filed on May 28, 2021.

(51) Int. Cl.
*G06Q 30/00* (2023.01)
*G06F 3/04815* (2022.01)
*G06Q 30/0601* (2023.01)

(52) U.S. Cl.
CPC ..... *G06Q 30/0643* (2013.01); *G06F 3/04815* (2013.01); *G06Q 30/0623* (2013.01); *G06Q 30/0631* (2013.01); *G06Q 30/0633* (2013.01)

(58) Field of Classification Search
CPC .............................................. G06Q 30/06–08
See application file for complete search history.

(56) References Cited

U.S. PATENT DOCUMENTS

| | | | |
|---|---|---|---|
| 5,103,291 A | 4/1992 | Lian-Mueller | |
| 6,214,392 B1 | 4/2001 | Ramirez | |
| 8,669,819 B2 | 3/2014 | Kohda | |
| 8,975,517 B2 | 3/2015 | Kohda et al. | |
| 10,431,614 B2 | 10/2019 | Gambino et al. | |
| 11,887,173 B2 * | 1/2024 | Haapoja | G06Q 30/0255 |
| 2016/0078512 A1 * | 3/2016 | Yopp | G06Q 30/0639 |
| | | | 705/26.41 |
| 2017/0038916 A1 * | 2/2017 | Beach | H04L 67/53 |
| 2017/0081101 A1 | 3/2017 | Begim | |
| 2017/0116667 A1 * | 4/2017 | High | G06T 19/006 |
| 2017/0301000 A1 * | 10/2017 | Morgan | G06Q 30/0631 |
| 2018/0032882 A1 * | 2/2018 | Joshi | G06N 20/00 |
| 2021/0174426 A1 * | 6/2021 | Isaacson | H04W 12/084 |
| 2022/0374969 A1 * | 11/2022 | Berger | G06Q 30/0643 |

OTHER PUBLICATIONS

"John Varvatos Rocks the eCommerce Experience with Salesforce: International Luxury Brand, John Varvatos Delivers an Immersive, Personalized Retail Experience with Salesforce", PR Newswire, Sep. 10, 2019 (Year: 2019).*

* cited by examiner

*Primary Examiner* — Ethan D Civan
(74) *Attorney, Agent, or Firm* — Aambell PC

(57) ABSTRACT

A system and a method for implementing a personalized online shopping experience are disclosed. The method includes receiving store information from a seller and generating navigable spaces in a virtual environment with sections based on the received store information, associating one or more products for sale in the store information with at least one section of a navigable space and receiving a command from a user device to access the navigable spaces, and determining the navigable space associated with the one or more products for sale on the user device based on the received command and the user's preference determined by machine learning algorithms. The method includes displaying a plurality of products selected for purchase in association with commands from the user, updating a shopping cart, and enabling the user to perform a purchase transaction in response to a purchase command received from the user through the user device.

20 Claims, 6 Drawing Sheets

SYSTEM AND METHOD FOR PROVIDING PERSONALIZED AND IMMERSIVE SHOPPING EXPERIENCE

TECHNICAL FIELD

The present invention relates to systems, devices, and methods relating to immersive experience systems (e.g., a simulation, virtual reality, and/or augmented reality), and more particularly to human-like assistance for e-commerce.

BACKGROUND

The use of online platforms for providing real-time experiences has grown exponentially over the years. In particular, immersive experiences have been created to mimic the reality of a variety of experiences ranging from games, travel, etc. However, one area that is lacking immersive platforms is e-commerce. The conventional platforms do not provide an immersive experience that is visually appealing, and easy to navigate and discover the items as per the user's interest. The challenge is replicating a real-world retail shopping experience as a virtual immersive experience in which users may browse items for sale in an easy manner and find their choice of items without leaving the immersive experience.

Conventionally, goods disclosed on a store web page commonly include a limited text description and some images. Thus, using an improved system with voice capabilities helps the user ask questions in a natural manner using spoken language and make an informed choice available on the website.

Moreover, images and inventory are represented in a two-dimensional manner. Thus, a shopper is not able to appreciate the goods fully, finds it hard to navigate when there are too many products to choose from, and can miss out on aspects experienced during traditional shopping. Therefore, the use of an intelligent virtual shopping assistant brings back the experience of a brick and mortar store manned by store assistants.

Thus, there is a need for a system and method that provides a real-world-like experience that allows shoppers to select and purchase items with ease.

SUMMARY

Various embodiments of methods and systems for personalized and immersive e-commerce shopping.

In one embodiment, a server system is disclosed. The server system is configured to receive store information from a seller. The store information includes inventory details, collections, and products for sale. The server system is configured to generate navigable spaces in a virtual environment with sections based on the received store information and designs selected by the seller creating a virtual store. The server system is configured to receive a command from a user device to access the navigable spaces. Further, the server system is configured to associate one or more products, determined based on user preferences and machine learning algorithms, with at least one section of a navigable space. The server system is further configured to determine the navigable space associated with the one or more products for sale on the user device based on the received command, the one or more products determined by the machine learning algorithms, and arranged for the individual user for browsing and selecting products through commands from a user associated with the user device. Furthermore, the server system is configured to display a plurality of products selected for purchase or shortlist in association with the commands from the user. Thereafter, the server system is configured to update a shopping cart to perform a purchase transaction in response to a purchase command received from the user through the user device, or wish list to store the products for later retrieval, or a collection to share with the user's social network.

In another embodiment, a computer-implemented method is disclosed. The method performed by a server system includes receiving store information from a seller. The store information includes inventory details, collections, and products for sale. The method includes generating navigable spaces in a virtual environment with sections based on the received store information and designs selected by the seller creating a virtual store. Further, the method includes receiving a command from a user device to access the navigable spaces. Furthermore, the method includes associating one or more products, determined based on user preferences and machine learning algorithms, with at least one section of a navigable space. The method includes determining the navigable space associated with the one or more products for sale on the user device based on the received command, the one or more products determined by the machine learning algorithms, and arranged for the individual user for browsing and selecting products through commands from a user associated with the user device. The method includes displaying a plurality of products selected for purchase or shortlist in association with the commands from the user. Thereafter, the method includes updating a shopping cart to perform a purchase transaction in response to a purchase command received from the user through the user device, or wish list to store the products for later retrieval, or a collection to share with the user's social network.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those skilled in the art will understand that the drawings are not to scale. Wherever possible, like elements have been indicated by identical numbers.

Figure 1:
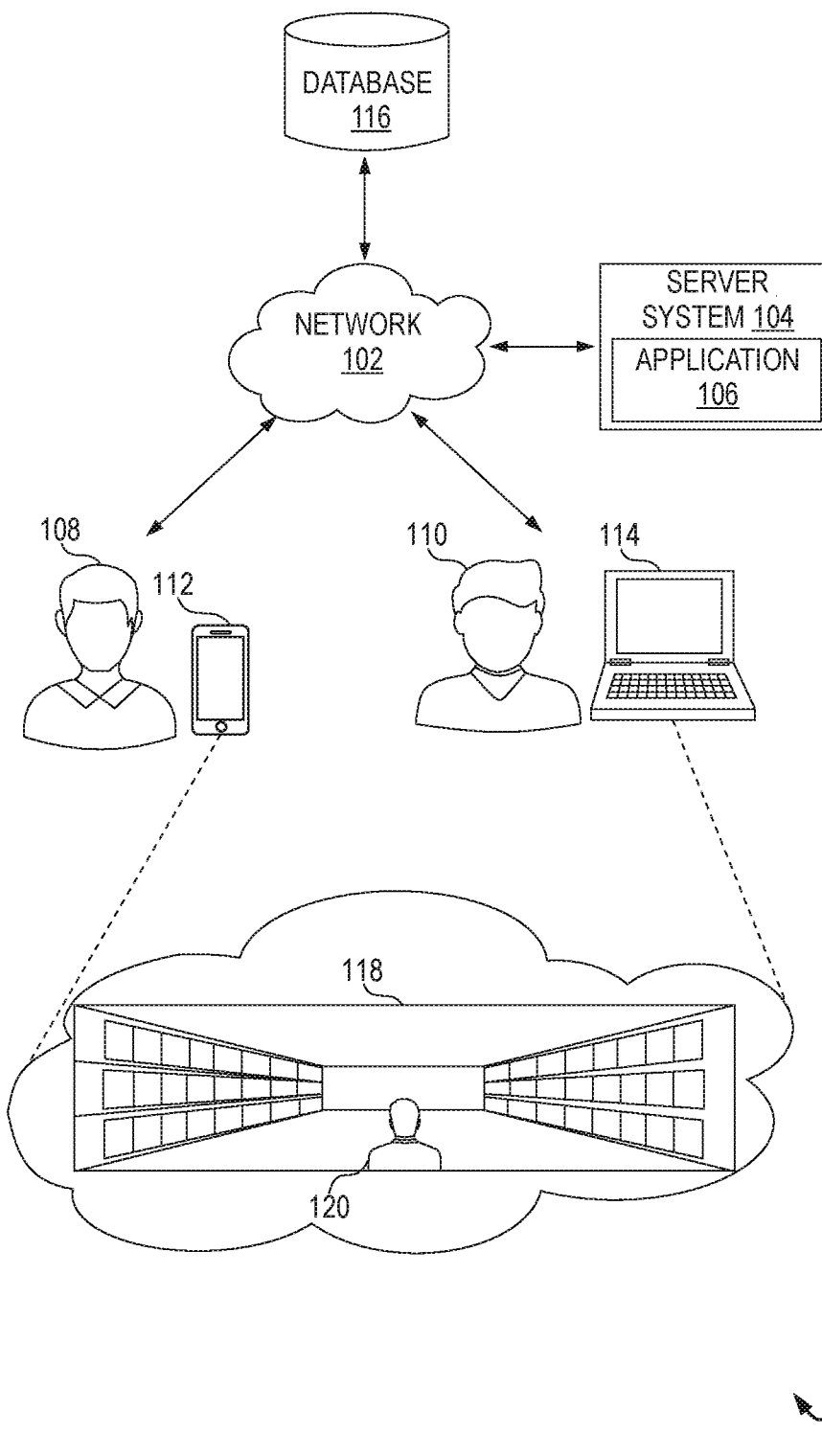
FIG. 1 is a diagram of the environment of an immersive shopping system, in accordance with an embodiment.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

OVERVIEW

Various embodiments of the present disclosure provide methods and systems for an immersive e-commerce platform. The present invention discloses a method for creating an immersive e-commerce platform such that users can interact with a virtual store assistant to find their choice of products on the e-commerce platform.

An immersive e-commerce application is provided for facilitating interaction with a virtual store assistant and discovering products in a virtual store before making the transaction. The user accesses the e-commerce application on the user device by a voice command, by typing words in the chat section, or by browsing using the scroll or click options. The e-commerce application is hosted on a server system and an instance of the e-commerce application is run on the user device. The e-commerce application depicts a virtual store that is generated by the server system upon receiving information from a seller. The information from the seller may include inventory details, a list of products for sale with product information, store banners, and the like. The virtual store may include navigable spaces that are associated with sections. The user can request specific types of products or browse the sections and view products that are automatically categorized, based on the preferences of the user, that are learned in real-time. The selected products can be placed on a shortlist or a wish list, to visit and purchase later.

Although process steps, method steps, or the like in the disclosure may be described in sequential order, such processes and methods may be configured to work in alternate orders. In other words, any sequence or order of steps that may be described in this patent application does not, in and of itself, indicate a requirement that the steps need to be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, and does not imply that the illustrated process or any of its steps are necessary to one or more of the invention(s), and does not imply that the illustrated process is preferred.

Various embodiments of methods and systems for an immersive e-commerce platform are further described with reference to FIG. 1 to FIG. 6.

FIG. 1 is an example representation of an environment 100 related to at least some example embodiments of the present disclosure. In an embodiment, the environment 100 includes a network 102, an application 106, a server system 104, a plurality of users 108 and 110 operating user devices 112 and 114, respectively, and databases 116. It shall be noted that two users 108 and 110 and two user devices 112 and 114 have been depicted in environment 100, however, more than two users 108 and 110 and two user devices 112 and 114 may be included in the environment 100. The user devices 112 and 114 are coupled to and in communication with server system 104 via the network 102. The user devices 112 and 114 may access an instance of the application using simple web interface, run an instance of the application 106, or the user devices 112 and 114 may be pre-installed with the application 106.

The network 102 may include any cloud system or private enterprise network or a mix of the two. The network 102 can be any wired or wireless network for facilitating communication between the server system 104 and the user devices 112 and 114.

In one embodiment, the application 106 can be accessed through the user devices 112 and 114 through channels such as web browsing. Alternatively, the application 106 may be installed on the user device (such as user devices 112 and 114). The user devices 112 and 114 may be any communication devices having hardware components for enabling user interfaces (UIs) of the application 106 to be presented on the user devices 112 and 114. The application 106 can be made available to the user devices 112 and 114 by way of allowing the users 108 and 110 to download the application 106 associated with the e-commerce platform from various sources. The server system 104 may be configured to facilitate API calls to be performed via the immersive experience, thereby providing the flexibility for a store owner to set up their own layout for the virtual store experience while using the functionality of the application 106 hosted on the server system 104. For instance, the application 106 can be downloaded from application stores such as Google Play store managed by Google®, Apple App store managed by Apple®, from websites, and the like. In some cases, the application 106 may be factory installed in the user devices 112 and 114 by the respective manufacturers.

In an embodiment, the server system 104 may reside software backend APIs corresponding to the application 106 which instructs the server system 104 to perform one or more operations described herein. In addition, the server system 104 should be understood to be embodied in at least one computing device in communication with the network 102, which may be specifically configured, via executable instructions, to perform as described herein, and/or embodied in at least one non-transitory computer-readable media.

The application 106 is an application/tool resting at the server system 104. In one embodiment, the server system 104 is configured to host and manage the application 106 and communicate with the user devices (e.g., the user devices 112 and 114) for providing an instance of the application 106.

The server system 104 is configured to host and/or manage the application 106 for uploading and streaming the associated immersive user interfaces to the user devices 112 and 114 (e.g., computer or smartphone), e.g. via a display of a smartphone or a Virtual Reality headset or the like.

In some embodiments, the environment 100 comprises a client-server architecture where the application 106 is configured as a server and at least one of the user devices 112 and 114 is configured as a client computing device.

The users 108 and 110 can be at least one of the buyers and sellers registered with the application 106 through the use of user devices 112 and 114. The sellers upload store information to the application 106 for the server system 104 to generate a virtual store such that the buyers search for, discover, shortlist, share information about, or buy products through the application 106.

The user devices 112 and 114 may include any suitable type of computing device (or system) that is capable of directly or indirectly communicating with the server system 104 via the network 102. The user devices 112 and 114 may also be capable of directly or indirectly communicating with the database 116. For example, any of the user devices 112 and 114 may include a smartphone, a smartwatch, a tablet, a laptop, a desktop computer, a fitness or activity tracker, a global positioning system (GPS) device, a smart device, a digital media player, a wearable technology device, or any mobile device capable of exchanging data with the server system 104 via the network 102.

In an exemplary scenario, the server system 104 is configured to allow one or more sellers to upload and/or import store information. Upon registration of a seller with the application 106, the seller can provide a link to a file created externally and hosted on a separate application, or freshly upload videos/photographs of an inventory or store using the user device 112, 114. The store information can include inventory details, collections, products for sale, and the like. For example, the seller may upload profile pictures, digital banner images, and a list of products with their details available at the store (such as shampoo, potato chips, and home appliances) to the server system 104. The server system 104 receives store information from the seller. In other words, the server system 104 may receive audio, video, text, and/or multimedia content from the seller through a user device 112 and 114. In addition to the store information, the server system 104 may use the information available in the database 116 to generate a virtual representation of the store.

The database 116 is an external storage device to store information regarding the user's activities related to the product, such as viewing the product details, clicking on the product links, adding to shortlist, recommending it to other users, or purchasing the products. Further, the database 116 stores real-time and historical information related to activities, regarding the product, made by multiple users from the store. For example, the database 116 stores information related to a "body wash" that is most bought from a store X. In other examples, the database 116 stores information related to the buyers who frequently visit the store X to buy "shampoo". Further, the database 116 may include three-dimensional (3D) content information and mixed reality (MR) graphics templates related to the creation of the 3D content. In one example, the database 116 can be a single storage device or a network of storage devices in communication with each other.

The server system 104 is configured to combine or stitch photographs, video, animations, audio, or the like received from the seller to generate a rich two-dimensional or multi-dimensional (i.e., virtual) representation of the store. In addition to the store information received from the seller, the server system 104 is configured to access the database 116 to retrieve virtual layouts or physical and dimensional information of the store to generate the virtual representation of the store. Further, the multi-dimensional representation of the store can be divided into individually navigable spaces. Each navigable place is associated with a section of products. In one embodiment, the navigable spaces are configured as voice-based navigable spaces. However, other means for identifying and selecting navigable spaces can be used such as text chat or a click on suggestion menus that are dynamically added with each response. For example, the multimedia content of the floor map is processed to generate one or more location points for constructing a virtual representation of the store. Alternatively, digital-only layout templates can be used that have no correlation to any physical store layout. The virtual representation can be retained and stored in the database 116 and disclosed when requested by a user.

The server system 104 is further configured to categorize and classify each product for sale into sections in association with the navigation space. In addition, the server system 104 may determine products of interest for a user based on their activities on the virtual store and may display the products of interest on the user devices 112 and 114. The activity data related to the user may include the user's past transactions, wish list, user preferences related to products, collections of products curated by the user, tags, and descriptions added by the user to each such collection, and the like. A key component of the server system 104 includes machine learning algorithms that continuously map a user's interest information with the attributes of the products that he/she views, clicks on, or adds to the wish list. A user interest matrix is created based on the calculation of the user's interest and mapping of the machine learning algorithms and is saved in a compressed format as a vector in a cache of the server system 104. The user interest matrix is stored as the vector for quick access while the user is waiting for a response from the voice command. The vector is used to sort the results of the search or the product recommendations to match each user (buyers) in real-time. The server system 104 is configured to determine the products to be displayed to the user based on the vector.

The seller can retrieve the user interest matrix from the server system 104 and assist the buyer in real-time before the buyer leaves. For example, the seller may connect with the buyer through the application 106 and provide real-time assistance in relation to a product. With this information, the server system 104 may provide products of interest to users 108 and 110 through streaming and displaying immersive user interfaces on the user devices 112 and 114 for the users to shop. Further, the users 108 and 110 can access the application 106 and retrieve the user's interest matrix to understand how the user got a product recommendation. In one example, the categorization and classification of the products for sale can be performed using the recommendations obtained from the machine learning algorithm. Initially, the algorithm is trained by descriptions added to collections (such as products) added by the seller setting up the virtual store, the product catalog, and simulated user events. Once users start browsing the store, each user's actions on the products keep updating the algorithm. Examples of user's actions may include search commands for products, shortlisting of products, sharing of products with other users, etc.

The categorized information may include item descriptions (such as the color, size, type of product, and other data), including text, videos, and images, a minimum price and maximum price at which the product may be sold, the number of products expected to be sold over a period of time, the possible pairing of this product with another to create a section or column of navigable collection of products.

In an exemplary scenario, when a user (such as the users 108 and 110) accesses the application 106 for the e-commerce platform, the server system 104 receives a command from a user device (such as user devices 112 and 114) associated with the user. For example, the user may run a query for a certain product on the application 106 either through the use of a voice command or a text entered in a search engine of the application 106. Then, the server system 104 interprets the text and maps it to a shopping command, along with the additional parameters. In response, the server system 104 retrieves the most relevant products matching the user's preference based on recommendations provided by the machine learning algorithm in the server system 104.

The server system 104 may receive a selection of the product from the product recommendations provided to the user. For example, the user may select product A from the product recommendations through the user devices 112 and 114. Thereafter, the server system 104 may be utilized to checkout and process payment for confirming a purchase transaction of the product. However, other means of integrating the cart and checkout process may be utilized. For example, the server system 104 may interface with backend data with other stores via custom APIs.

According to an exemplary scenario, the server system 104 provides one or more user interfaces to upload and/or import a plurality of collections of products for sale from a seller, based on the information provided by the server system 104 that generates a virtual construction of navigable spaces with sections of categorized items for sale. The navigable spaces may be voice-based navigable spaces. However, other means of navigable space may be integrated. For, example the navigable space may be a gesture-based navigable space.

The server system 104 then associates one or more products for sale with at least one of the navigable spaces. The server system 104 then streams and displays a virtual store 118 which a user can browse and select the items categorized in the sections of constructed navigable spaces. A user can browse different navigable spaces with actions such as forward, backward, sideways, select, add to cart, etc. in either a first or third-person view (for instance, in an avatar 120 that represents a third-person view) using various voice commands. A key aspect of this experience is that the user does not have to worry about the location of specific products or take the effort to continuously look for a product in a fixed placement like a real store. On the other hand, since the products are dynamically re-arranged for the user in real-time using the machine learning algorithms, the user can find products matching his/her preferences easily. When a product is selected, more information pertaining to the item can be made available. Products of interest may be selected through voice commands and placed in a shortlist or shopping cart for purchasing. The server system 104 then accordingly updates a shopping cart in response to a purchase command received from the user through the user's device for completing a purchase transaction, or directs the user to another online site to complete the purchase.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g. one or more systems) or a set of devices (e.g., one or more devices) of the environment 100 may perform one or more functions described as being performed by another set of systems or another set of devices of the environment 100.

Figure 2:
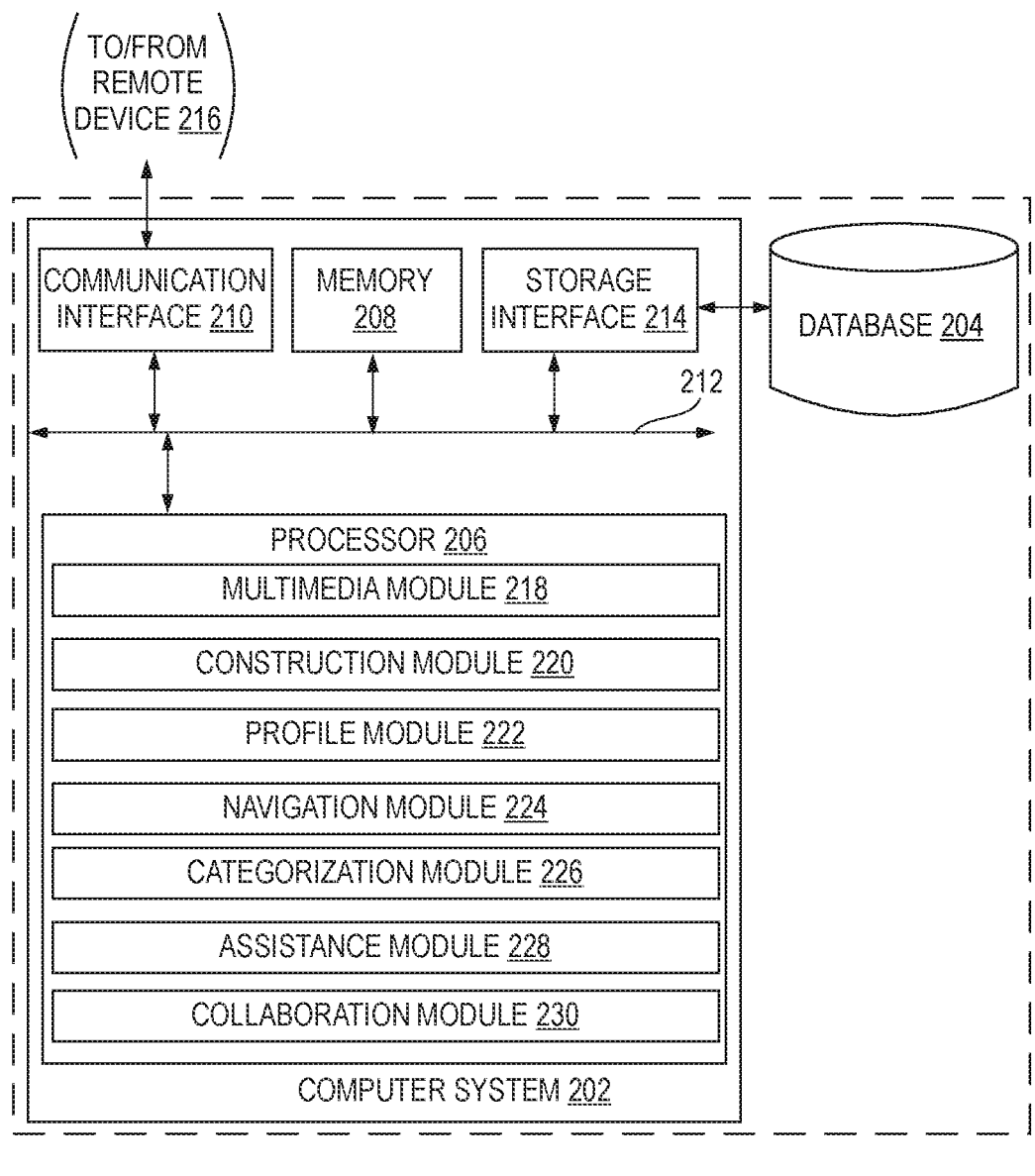
FIG. 2 is a block diagram of a server system, in accordance with an embodiment.

FIG. 2 is a block diagram of a server system 200 to provide an application for an e-commerce platform, in accordance with an embodiment of the present disclosure. In some embodiments, the server system 104 is embodied as a cloud-based and/or SaaS-based (software as a service) architecture. In one embodiment, the server system 200 is similar to the server system 104.

The server system 200 is configured to provide an instance of an application for the immersive e-commerce platform. In an embodiment, the server system 200 includes a computer system 202 and a database 204. The computer system 202 further includes at least one processor 206 for executing instructions, a memory 208, and a communication interface 210 that communicate with each other via a bus 212.

The processor 206 is operatively coupled to the communication interface 210 such that the processor 206 is capable of communicating with the remote device 216 such as user devices 112 and 114, or communicating with any entity connected to the network 102 (as shown in FIG. 1).

It is noted that the server system 200 as illustrated and hereinafter described is merely illustrative of an apparatus that could benefit from embodiments of the present disclosure and, therefore, should not be taken to limit the scope of the present disclosure. It is noted that the server system may include fewer or more components than those depicted in FIG. 2.

In an embodiment, the processor 206 includes a multimedia module 218, a construction module 220, a profile module 222, a navigation module 224, a categorization module 226, an assistance module 228, and a collaboration module 230.

The multimedia module 218 is configured to generate user interfaces for uploading or importing or capturing or receiving multimedia content associated with a product or store information from a seller. The multimedia content can include inventory information, collection details, and product information for sale. The multimedia module 218 evaluates the uploaded multimedia information to generate an estimation or approximation of the uploaded content. The communication interface 210 may receive multimedia content from the seller that is forwarded to the multimedia module 218. The seller may upload the multimedia content through the use of a user device (such as the user devices 112 and 114).

The profile module 222 is configured to store and maintain the profile details of a user. The profile details can include name, email id, address, phone number, etc. Further, the profile module 222 may also store an avatar associated with a user. In accordance with one embodiment, the avatar may be generated by the multimedia module 218 that emulates the physical attributes of a user as well as identify clothing that will fit in the desired manner (e.g., height, weight, the color of skin, hair, etc.).

The navigation module 224 is configured to facilitate seamless travel through the virtual environment in the application 106 without having to know the way or worry about a physical layout. For example, the environment can enable a user to ask for something and the possible matches automatically appear in front of the user, similar to the user being teleported to the right aisle in a real store. The user may then further navigate a much shorter personalized space using voice, chat, scroll, gestures, VR glasses, or the other methods mentioned in the document.

The categorization module 226 is configured to associate items of sale according to their characteristics. The characteristics can include category, size, shape, colors of items, the texture of items, etc. The categorization module 226 may integrate with the construction module 220 to collaborate and place the products for sale according to the navigable spaces generated. The categorization module 226 may include a machine learning algorithm that continuously maps a user's interest with the attributes of the products that he/she view, clicks on, or adds to the watch list. The information related to the user's interest can be accessed from the database 204. A user's interest matrix is created based on the information related to the user's interest and is saved in a compressed format as a vector in a cache of the memory 208. The seller can retrieve the user's interest matrix from the server system 200. With this information, the server system 200 may provide products of interest to users 108 and 110 through streaming and displaying immersive user interfaces on the user devices 112 and 114 for the users to shop. Further, the users 108 and 110 can access the application 106 and retrieve the user's interest matrix to understand how the user got a product recommendation. In one example, the categorization and classification of the products for sale can be performed using the recommendations obtained from the machine learning algorithm.

The assistance module 228 is configured to provide guidance to a user in traversing through a virtual environment and further make suggestions and/or recommendations for similar items of sale based on a real-time learning of the user's interest and the historical activity information about the user.

The collaboration module 230 is configured to facilitate communication between multiple shoppers to collaborate, ask for opinions, and shop together, similar to an experience of shopping with a group of friends. Further, each user may be represented by their avatar.

Figure 3:
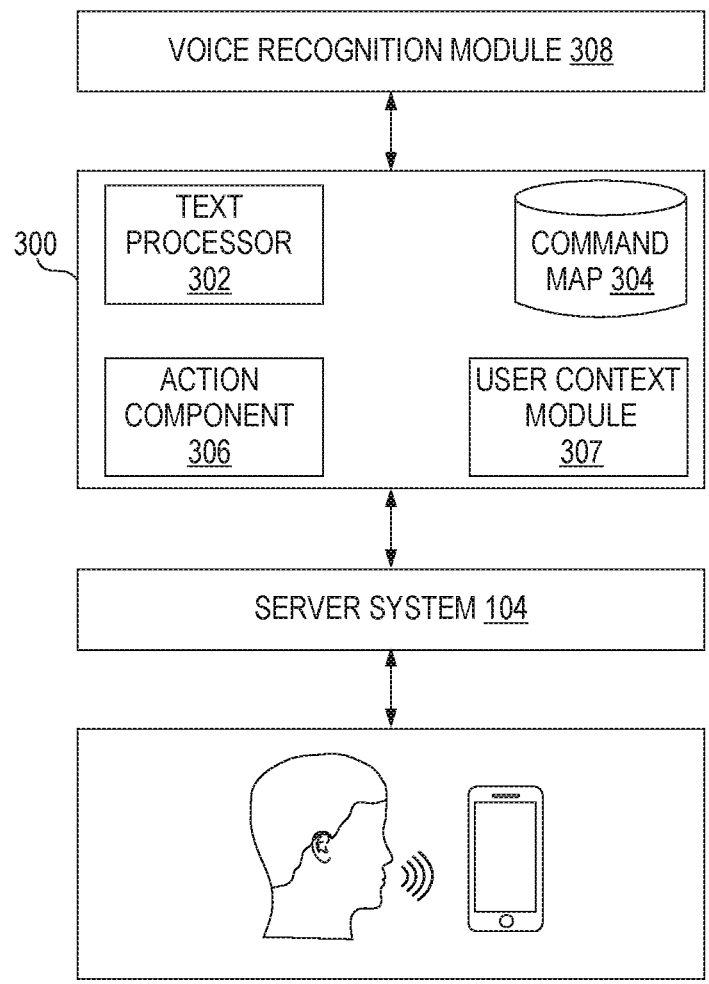
FIG. 3 is a block diagram showing the functional components of a voice command processing module of the immersive shopping system, in accordance with an embodiment.

FIG. 3 is a block diagram showing the functional components of a voice command mapping module 300 of an immersive shopping system, in accordance with an embodiment in the present disclosure. The module 300 may be embodied in the server system 104, or an application 106, or an electronic device, such as the user devices 112 and 114.

The voice command mapping module 300 is configured to receive the sound waves corresponding to the natural language commands that may be captured by one or more respective microphone(s) of the user devices and transmit the received sound signals to a voice recognition module 308. In an exemplary scenario, some or all of the processing of the sound recognition may be performed by the voice recognition module 308 disposed of as a remote service over one or more networks. When a user utters a shopping command for accessing the immersive shopping platform, the voice command mapping module 300 transmits the received command to the voice recognition module 308. The voice recognition module 308 processes the signal and transmits the processed text to the voice command mapping module 300. Then the voice command mapping module 300 interprets the received text and maps the text to the stored shopping command and thereby in response retrieves the most relevant items matching the user's preference or interest based on the machine learning algorithm.

According to an embodiment, the voice command mapping module 300 includes a text processor 302, a command map 304, an action component 306, and a user context module 307. The text processor 302 is configured to receive text returned from the voice recognition module 308 and attempts to find matches between recognized words or phrases and entries in the command map 304. The command map 304 provides access to the text processor 302 by storing a relationship or multiple relationships between a word or phrase to one or more operations or actions in a structured manner. After the word or phrase is mapped to a shopping command, the action component 306 is configured to execute a series of instructions or operations in response to the shopping command, and potentially after the determination of the command, the voice command mapping module 300 transmits the command to the functional component of server system 200 for further operations. The action component 306 accesses the user context module 307 to determine the appropriate action for the specific user based on the specific navigable space they are on, the previous commands, and the user interest matrix.

Figure 4:
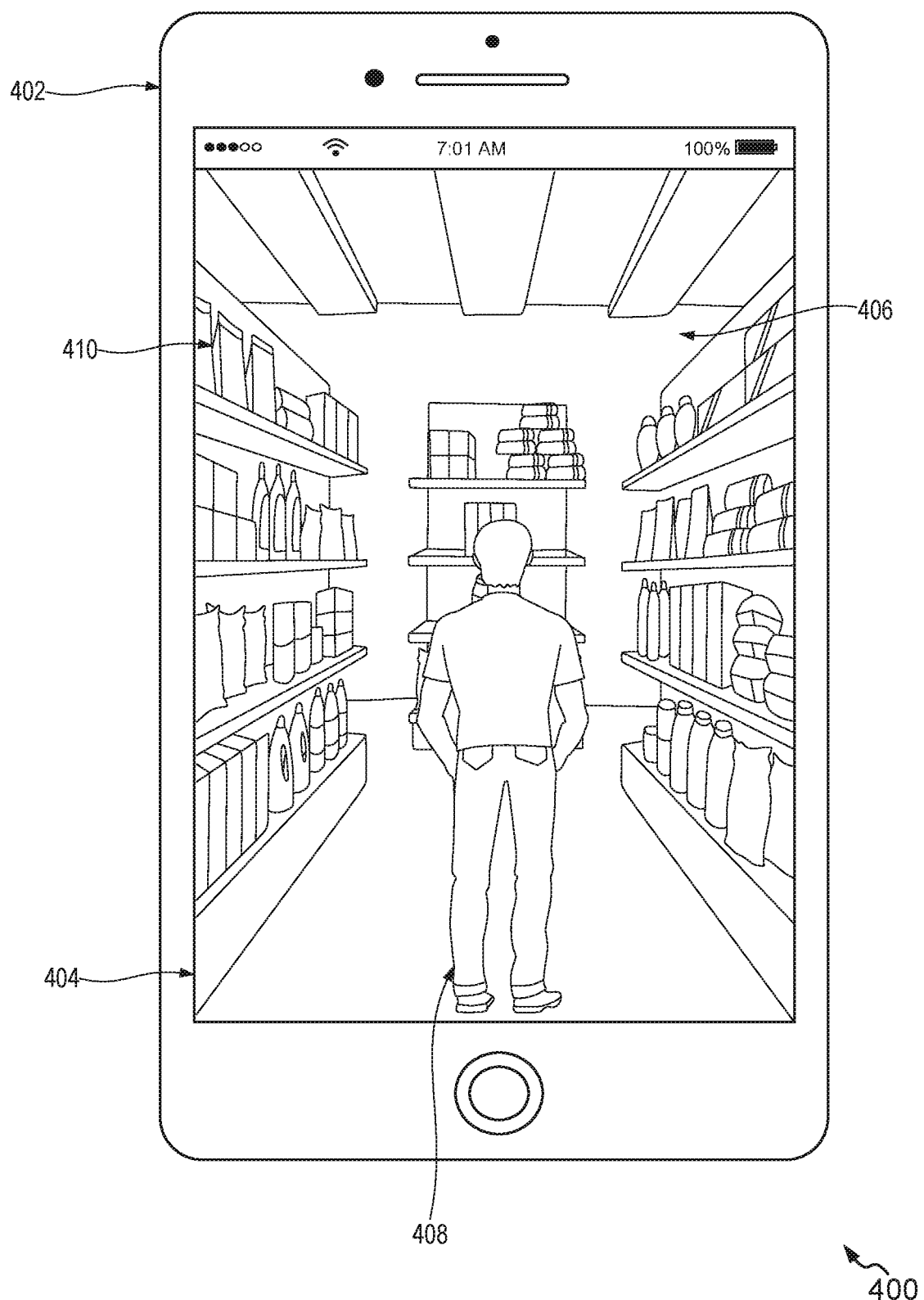
FIG. 4 depicts a user interface (UI) of an application of the immersive shopping system, in accordance with an embodiment.

FIG. 4 shows an example representation 400 of a user device 402 and a user interface (UI) 404 displayed on the user device 402 associated with a user, in accordance with an example embodiment of the present disclosure.

The UI 404 depicts a virtual store 406 on the application for an immersive e-commerce platform. The virtual store 406 is created by combining information uploaded by the seller through a user device 402. For example, store A is created by combining photographs of the products in a physical store uploaded by the seller. However, other multimedia content can be used to create the virtual store 406. The virtual store 406 depicted in the UI 404 includes product 410 placed on navigable spaces. The navigable spaces are associated with a section of products 410 and can be accessed through the use of commands from the user. In one example, the navigable spaces can be accessed by the use of voice commands from the user. The products displayed to the user can be sorted by a user interest vector. The user interest vector is created by a machine learning algorithm by mapping attributes of the products with the preferences of the user. The user preferences can be retrieved from external sources such as database 116. Further, product recommendations can be provided to the user based on the user interest vector. The machine learning algorithm is trained based on the user preferences of users and past transactions made by the users. In addition, information from external sources such as social media network, other shopping networks, and user profile information in a database can be used to train the machine learning algorithm. The server system may update the machine learning algorithm based on the transactions made in real-time. Further the UI 404 includes an avatar 408, of the user.

Figure 5:
FIG. 5 depicts another UI of the application, in accordance with an embodiment.

FIG. 5 shows an example representation 500 of a user interface (UI) 502 displayed on the user device associated with a user, in accordance with an example embodiment of the present disclosure. The UI 502 is similar to UI 404, therefore not explained here for brevity. However, the UI 502 depicts an avatar of the user, that can move through the aisles using various voice commands (e.g. forward, backward, sideways, select, add to cart, etc.).

Figure 6:
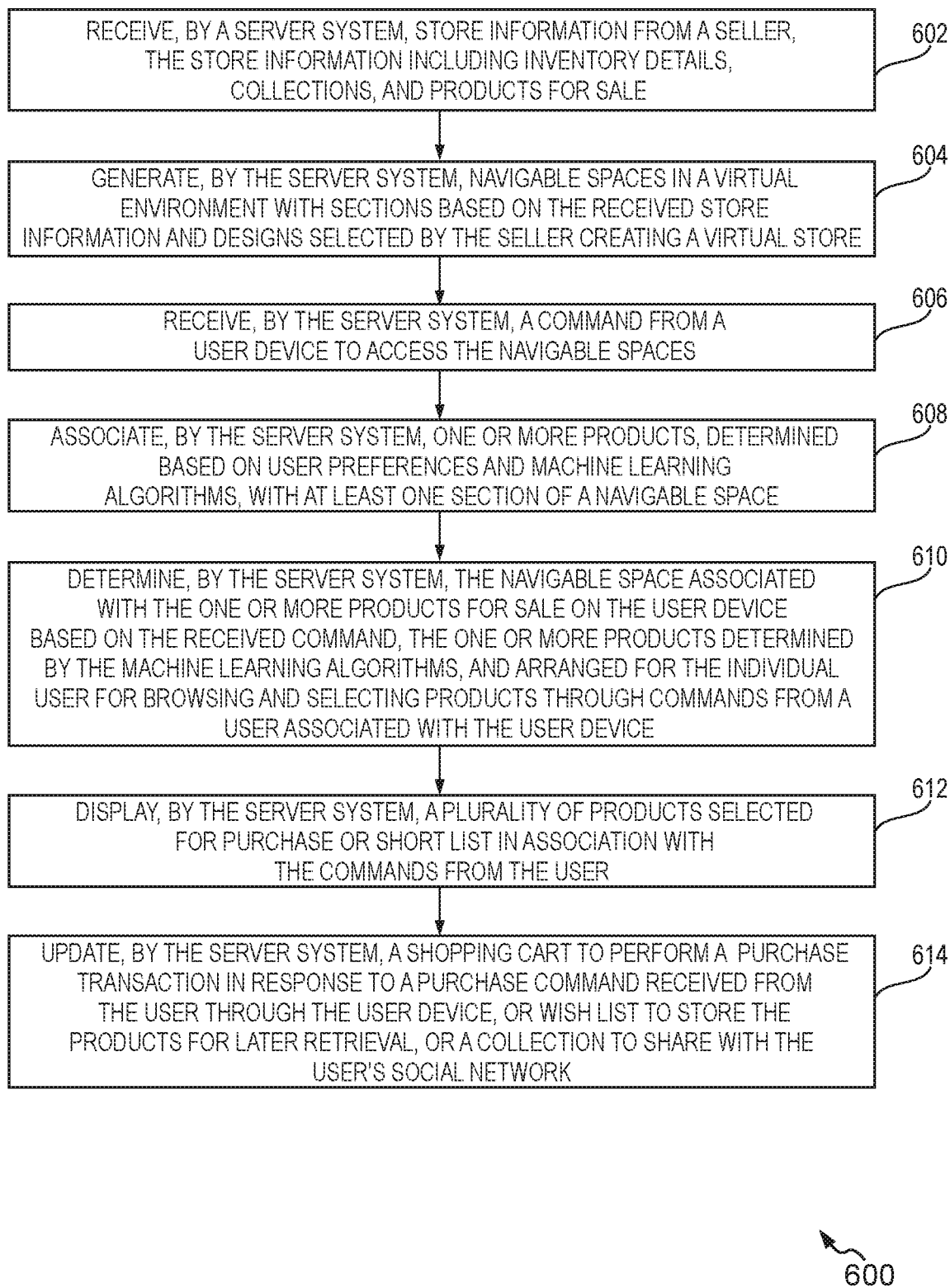
FIG. 6 is a flowchart illustrating a method according to aspects of the present disclosure.

FIG. 6 shows a flow diagram of a method 600 corresponding to an application of an immersive e-commerce platform. The various steps and/or operations of the flow diagram, and combinations of steps/operations in the flow diagram, may be implemented by, for example, hardware, firmware, a processor, circuitry, and/or a server system (such as the server system 104, 200) explained with reference to FIGS. 1 and 2 and/or by a different device associated with the execution of software that includes one or more computer program instructions. The method 600 starts at operation 602.

At operation 602 of the method 600, the server system 104, 200 receives store information from a seller. The store information includes inventory details, store design, collections, and products for sale.

At operation 604 of the method 600, the server system 104, 200 generates navigable spaces in a virtual environment with sections based on the received store information and designs selected by the seller creating a virtual store. The virtual environment is the virtual store that includes navigable spaces and one or more locations for the placement of products.

At operation 606 of the method 600, the server system 104, 200 receives a command from a user device to access the navigable spaces.

At operation 606 of the method 600, the server system 104, 200 associates one or more products, determined based on the user preferences and machine learning algorithms, for sale in the store information with at least one section of navigable space. The one or more products are associated with the navigable spaces based on the seller's preference and recommendations to be provided to a user.

At operation 610 of the method 600, the server system 104, 200 determines the navigable space associated with the one or more products for sale on the user device based on the received command, the one or more products determined by the machine learning algorithms, and arranged for the individual user for browsing and selecting products through commands from a user associated with the user device.

At operation 612 of the method 600, the server system 104, 200 displays a plurality of products selected for purchase in association with commands from the user; and At operation 614 of the method 600, the server system 104, 200 updates a shopping cart to perform a purchase transaction in response to a purchase command received from the user through the user device, or wish list to store the products for later retrieval, or a collection to share with the user's social network.

Various embodiments disclosed herein provide numerous advantages. More specifically, the embodiments disclosed herein suggest techniques for providing an immersive shopping system that is easily navigated by a user through voice commands. Further, the system allows users to move at variable speeds through collections without having to use either paging or scrolling techniques and provides an intuitive feel while navigating data, thereby providing visually engaging user interaction. The use of machine learning algorithms to dynamically customize the virtual sections to the user's interest enables the user to quickly locate the desired item. The modularity of the voice, intelligence, and visual elements can assist the user to continue browsing products while the voice assistant brings additional information or products. The same software can be used in different settings-a two-dimensional web display or a 3D game-like display by just changing the user interface components. Further, the method provides a high retrieval speed and matching of the user's interest in the products within an acceptable conversation response time. Most AI algorithms are black boxes, and the results are hard to explain. In this case, the user's interest vector can be retrieved and exported out to show clearly why they got a certain recommendation. The advantage of having the user's interest available as output is that a customer support person or store assistant can see this information and add their suggestions or assist the shopper in real-time before they leave. They get access to real-time shopper insights, which can be very useful. The algorithm is agnostic of the vertical category and works across any category or catalog without changes or manual configuration. This makes the setting up of a new virtual store very quick and simple.

The disclosed systems and methods with reference to FIGS. 1 to 6, or flow chart 600 may be implemented using software including computer-executable instructions stored on one or more computer-readable media (e.g., non-transitory computer-readable media, such as one or more optical media discs, volatile memory components (e.g., DRAM or SRAM)), or non-volatile memory or storage components (e.g., hard drives or solid-state non-volatile memory components, such as Flash memory components) and executed on a computer (e.g., any suitable computer, such as a laptop computer, netbook, Webbook, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc. described herein may be enabled and operated using hardware circuitry (for example, complementary metal-oxide-semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or Digital Signal Processor (DSP) circuitry).

The present disclosure is described above with reference to block diagrams and flowchart illustrations of the method and system embodying the present disclosure. It will be understood that various blocks of the block diagram and flowchart illustrations, and combinations of blocks in the block diagrams and flowchart illustrations, respectively, may be implemented by a set of computer program instructions. These set of instructions may be loaded onto a general-purpose computer, special purpose computer, or other programmable data processing apparatus to cause a device, such that the set of instructions, when executed on the computer or other programmable data processing apparatus, creates a means for implementing the functions specified in the flowchart block or blocks. Although other means for implementing the functions including various combinations of hardware, firmware, and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory medium or means that can contain, store, communicate, propagate or transport the instructions for use by or in connection with an instruction execution system, apparatus, or device, such as a computer. A computer-readable medium may include a computer-readable storage medium that may be any medium or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such are intended to cover the application and/or implementation without departing from the scope of the claims.

The invention claimed is:

1. A computer-implemented method, comprising:
   receiving, by a server system, store information including a plurality of products for sale;
   receiving, by the server system, a command from a user device associated with a user to access a virtual store having the store information;
   generating, by the server system, a navigable space in the virtual store, wherein:
      the navigable space displays a layout with one or more products selected from the plurality of products by a machine learning algorithm,
      the layout is dynamically re-arranged by the machine learning algorithm in real-time for the selected one or more products, and
      the one or more products are selected by the machine learning algorithm to be of interest to the user based on an interest matrix specific to the user and stored in the server system;
   receiving, by the server system, a command from the user device to select or purchase a product in the navigable space; and
   updating with the product, by the server system, a shopping cart to perform a purchase transaction, or a wish list for later retrieval, or a collection to share with a social network.

2. The method as claimed in claim 1, further comprising:
   mapping, by the server system, attributes of the one or more products with user interest information in a database;
   generating, by the server system, the user interest matrix based on the mapping, wherein the user interest matrix is stored as a vector; and
   providing, by the server system, product recommendations to the user based on the vector, wherein the vector is used to sort results of a search or the product recommendations to match each user in real-time.

3. The method as claimed in claim 1, wherein the store information further includes videos or image content of the one or more products.

4. The method as claimed in claim 3, wherein:
   the store information further comprises dimensions of the virtual store, and
   the method further comprises generating a virtual representation of the virtual store based on the store information.

5. The method as claimed in claim 1, further comprising generating an individually personalized multi-dimensional representation of a store by combining multimedia content corresponding to the store, and/or preferences of the user.

6. The method as claimed in claim 5, wherein generating the navigable space is based on the multi-dimensional representation of the store, and/or the preferences of the user.

7. The method as claimed in claim 1, further comprising determining products of interest based on history data related to the user and user activity on the virtual store, and displaying the products of interest to the user.

8. The method as claimed in claim 1, wherein the navigable space is a voice-guided, chat or click or scroll or gesture-based navigable space.

9. The method as claimed in claim 1, further comprising generating the user interest matrix based on information related to user preferences, wherein the user interest matrix is stored in a compressed format as a vector in the server system.

10. The method as claimed in claim 9, wherein the user interest matrix is retrieved from the server system to determine product recommendations for users.

11. A server system configured to:
   receive store information including a plurality of products for sale;
   receive a command from a user device associated with a user to access a virtual store having the store information;
   generate a navigable space in the virtual store, wherein:
      the navigable space displays a layout with one or more products selected from the plurality of products by a machine learning algorithm, the layout is dynamically re-arranged by the machine learning algorithm in real-time for the selected one or more products, and the one or more products are selected by the machine learning algorithm to be of interest to the user based on an interest matrix specific to the user and stored in the server system;

receive a command from the user device to select or purchase a product in the navigable space; and update with the product, a shopping cart to perform a purchase transaction, or a wish list for later retrieval, or a collection to share with a social network.

12. The server system as claimed in claim 11, wherein the server system is further configured to:

map attributes of the one or more products with user interest information in a database;

generate the user interest matrix based on the mapping, wherein the user interest matrix is stored as a vector; and provide product recommendations to the user based on the vector, wherein the vector is used to sort results of a search or the product recommendations to match each user in real-time.

13. The server system as claimed in claim 11, wherein the store information further includes video and image content of a store, or a virtual-only layout that has no correlation with a real store.

14. The server system as claimed in claim 13, wherein the store information further comprises dimensions of the virtual store, the server system further configured to generate a virtual representation of the virtual store based on the store information.

15. The server system as claimed in claim 11, wherein the server system is further configured to generate a multi-dimensional representation of a store by combining multimedia content corresponding to the store.

16. The server system as claimed in claim 15, wherein the server system is further configured to generate the navigable space based on the multi-dimensional representation of the store.

17. The server system as claimed in claim 11, wherein the server system is further configured to determine products of interest based on history data related to the user and user activity on the virtual store, and display the products of interest to the user.

18. The server system as claimed in claim 11, wherein the navigable space is a multi-mode-based navigable space including voice, chat, clicks, scrolling, or gestures.

19. The server system as claimed in claim 11, wherein:

the server system is further configured to generate the user interest matrix based on calculation of the user's interest by machine learning algorithm, and the user interest matrix is stored in a compressed format as a vector in the server system, for quick access while the user is waiting for response from a voice command.

20. The server system as claimed in claim 19, wherein the user interest matrix is retrieved from the server system to determine product recommendations for users.

* * * * *